(12) United States Patent  
Kohan

(10) Patent No.: US 6,319,433 B1  
(45) Date of Patent: Nov. 20, 2001

(54) COMPOSITE OPHTHALMIC LENS REMOLDING SYSTEM FOR FORMING A LENS THEREIN

(75) Inventor: George Kohan, Hudson, FL (US)

(73) Assignee: Invicta Corporation, Boca Raton, FL (US)

( * ) Notice: Subject to any disclaimer, the term of this patent is extended or adjusted under 35 U.S.C. 154(b) by 0 days.

(21) Appl. No.: 09/396,126

(22) Filed: Sep. 14, 1999

(51) Int. Cl.[7] ..................................................... B29D 11/00
(52) U.S. Cl. .................. 264/1.32; 156/275.5; 156/275.7; 264/1.36; 264/1.7; 264/313; 264/571; 425/127; 425/174.4; 425/808
(58) Field of Search ............................... 264/1.1, 1.7, 1.8, 264/2.5, 1.32, 1.36, 1.38, 571, 313, 316; 425/808, 127, 110, 174.4, 387.1, 388; 156/275.5, 275.7; 351/166

(56) References Cited

U.S. PATENT DOCUMENTS

| | | | |
|---|---|---|---|
| 5,219,497 | * 6/1993 | Blum | 264/1.7 |
| 5,372,755 | * 12/1994 | Stoerr | 264/1.7 |
| 5,851,328 | * 12/1998 | Kohan | 264/1.7 |

* cited by examiner

Primary Examiner—Mathieu D. Vargot  
(74) Attorney, Agent, or Firm—Proskauer Rose LLP

(57) ABSTRACT

A method of forming an ophthalmic lens using a composite ophthalmic lens vacuum mold to quickly and inexpensively produce, on-site, multi-focal, prescription and non-prescription optical quality eyeglasses, with or without photochromic, and photochromic non-prescription (e.g., sunglasses, safety glasses, reading glasses, etc.) optical quality eyeglass via a vacuum remolding. The method further includes a rigid remolding process for forming the composite ophthalmic lens.

35 Claims, 4 Drawing Sheets

COMPOSITE OPHTHALMIC LENS REMOLDING SYSTEM FOR FORMING A LENS THEREIN

FIELD OF THE INVENTION

The present invention is concerned with the production and/or modification of plastic/plastic or plastic/glass laminate lenses by a process of casting a "wafer" lens to a base lens by way of a curing process, the base lens is usually a prescription lens. Conventionally, such lenses are made by a process involving (a) determining the curvature of the base lens, selecting a wafer lens having a conforming curvature, and (c) adhering the mating surfaces to each other. The present invention overcomes the requirement for stocking a full set of wafer lenses of various curvatures. The invention is a remolding system based on the discovery of two processes. The first discovery is the creation of a wafer lens by a vacuum remolding process. The second discovery is the creation of a wafer lens by a rigid remolding process. In the vacuum molding process, the curvature of a given flexible mold, with the negative impression of a progressive, can be satisfactorily deformed by a vacuum process to match the convex curve of the base lens. The deformed flexible mold has an amount of monomer placed in the negative impression/recess and along the upper surface. A base lens is seated in the monomer, and the monomer cures while the flexible mold is in the deformed state, producing an optical quality lens with no noticeable distortion. In the rigid remolding process, a stock lens and mold lens, with matching concave curvatures pre-determined by the prescription, are selected. The convex surface of the stock lens is placed in the concave surface of the mold lens. The pair of lenses are spaced apart to create a cavity. Monomer is injected into the cavity and cured within the cavity to create an optical quality lens with no noticeable distortion. Accordingly, it is now necessary to only stock flexible molds with a variety of curvatures, such as a 6 base curve, in order to be able to modify any curvature base lens when following the procedure according to the present invention; eliminating the need to stockpile a traditional complete selection of wafer lenses covering the range of available curvatures.

The invention makes it possible to quickly (in a matter of minutes), and inexpensively, create bifocal progressive prescriptions from stock lenses. The invention further makes it possible to convert a stock prescription or non-prescription lens into a photochromic or a tinted photochromic non-prescription (e.g., sunglasses, safety glasses, reading glasses, etc.), prescription, multi-focal or progressive plastic or glass optical quality eyeglass. The invention further makes it possible to modify the prescription of lenses taken directly from the lens frames of a client. The invention further concerns lenses produced by the method wherein the monomer used to form the wafer lens and adhere the wafer lenses to the prescription lens includes photochromic pigments, thereby producing photochromic lenses. Photochromic lenses produced by this process are characterized by an extremely rapid photochromic response. Finally, the invention makes it possible to convert stock Polaroid lenses into non-prescription/prescription multi-focal or progressive and photochromic plastic or glass optical quality lenses.

BACKGROUND OF THE INVENTION

On-site production of prescription lenses is currently on the rise. Advances have recently been made on two fronts in materials and methods for the on-site production of prescription lenses: advances designed to reduce the amount of stock materials which must be carried on site, and advances in reduction of the time needed to produce the prescription lenses. However, none of these approaches has made it possible to eliminate the need to carry wafer lens for adhesion to base lens. Further, no approach has made it possible to transform stock prescription lenses to lenses of different prescriptions or to bifocals or multi-focal lenses in a matter of minutes, including the option of rendering the lenses photochromic. Further, none of the available methods permits the lens crafter to utilize a flexible mold and monomer to form a simple wafer lens onto stock lenses during a curing process, yet offer a wide variety of photochromic properties, tinting, UV protection, scratch resistance, and other desirable properties.

More specifically, one approach to on-site custom lens production involves casting an additional plastic layer onto a plastic lens blank. See, for example, in U.S. Pat. No. 2,339,433 (Staehle) disclosing a method of adding a correction to a molded plastic lens by adding a thin level of resin. U.S. Pat. No. 3,248,460 also discloses means for casting plastic lenses from thermosetting or thermoplastic materials wherein a plastic blank having significantly less curvature than required for the full-intended prescription of the lens is used as a base. An additional layer of material is cast onto this base. The patent employs a conventional optical gasket to provide space between the plastic blank and the mold and to hold the resin material in the cavity created thereby. The additional layer of material changes the curvature of the resulting lens over the vast majority of its surface, thereby changing the prescription of the resulting finished lens to the power required. A disadvantage of this system is that the material must be cured by heat. Such a heat curing process requires heating over a period of more than 12 hours, thus making the formation of the lens a long, drawn-out process. A further obvious disadvantage is that photochromic lenses could not be produced from such materials and methods. Others have tried to manufacture multi-focal or progressive plastic lenses using a lamination technique. Such a technique joins a preformed plastic section, generally referred to as a wafer or wafer lens or veneer lens, to another cured plastic prescription lens. In all cases, the curvature of the wafer lens must correspond to the mating curvature of the base lens, and, thus, the number of wafer lenses which must be maintained in stock corresponds to (a) the number of base lens curvatures to be matched times, (b) the strengths of the corrections times, and (c) the various strengths of progressive or bifocal prescriptions [i.e., (a) x (b) x (c)]. A base lens is matched to a preformed wafer section defining a multi-focal or progressive region and the conforming mating surfaces of these lenses are joined by an adhesive. See, for example, U.S. Pat. No. 4,940,205 (Rudd, et al.) teaching a method and apparatus for forming a laminated bifocal lens which includes selecting a frontal lens component having a bifocal element and bonding the frontal lens component to a rear lens component. The non-prescription frontal lens carrying the bifocal element is referred to as a veneer lens, and the rear lens is referred to as the prescription lens. The arced inner surface of the veneer lens meniscus has the same curvature as the front surface of the prescription lens. To fill a prescription, a technician matches the desired frontal lens with a rear lens carrying the desired prescription base. The adhesive for bonding the two lens components is the same monomer used to cast the lens components. Accordingly, the curvature of the veneer lens must match that of the prescription lens, and no provision is made for incorporation of photochromic pigments.

As a somewhat different approach, see also U.S. Pat. No. 5,433,810 (Abrams) teaching a method and apparatus for lamination of composite eyeglass lenses. Front and rear lenses are laminated together by holding the front lens in an XY adjustable stage on a laminating axis, holding the rear lens in a pre-determined position relative to the laminating axis, and moving the two lenses together on the laminating axis to spread an adhesive between them. Then, the adhesive between the pressed-together lenses is cured by UV radiation directed through the front lens before the lenses are removed from the laminator. The bonding process involves placing a curable adhesive on the concave interface surface of the front lens; pressing the convex interface surface of the rear lens against the adhesive in the front lens to spread the adhesive throughout the space between the two lenses; and curing the adhesive to bond the lenses together, forming a composite lens. The curvatures of the mating surfaces conform to each other, but the convex surface may have a slightly greater curvature, up to 0.25 diopter greater, in order to facilitate the spread of adhesive between the two lenses from the inside out (col. 3, line 34). While Abrams teaches an apparatus for aligning and laminating front and rear lenses to form a composite eyeglass lens, Abrams does not teach lens compositions and does not address photochromic lenses.

Photochromic ophthalmic lenses made of mineral glass are well known. Photochromic pigments have good compatibility with mineral glass. However, photochromic mineral glass lenses are heavy and have a slow photochromic reaction time, particularly in the change from dark lenses to light lenses. Today, however, most spectacle lenses are made from any of a variety of plastics or from plastic-glass composites. Plastics include acrylic, PPMA (a product of PPG-Pittsburgh Plate Glass) also known as CR-39, and LEXAN (Polycarbonate made by General Electric). For example, U.S. Pat. No. 3,946,982 (Calkins) discloses a method of casting multi-focal lenses. He does this by holding two mold portions together with a gasket, one of the molds having a recessed portion, so as to provide a bifocal effect. Liquid plastic is injected between the two mold portions, cured and cooled, thereby creating an entirely new lens. However, this is a slow, laborious and time-consuming process.

Recently, attempts have been made to apply photochromic pigments to lightweight plastic lenses to render them similarly photochromic. However, for various reasons, this objective has not been satisfactorily achieved with plastic lenses. One reason for the lack of success has to do with the chemistry of ethylene glycol diallyl dicarbonate, the most commonly used monomer for producing plastic ophthalmic lenses. This monomer is cast in a lens mold and polymerized with a catalyst such as isopropyl percarbonate. One might expect that a plastic lens made from such a monomer could be rendered photochromic simply by incorporating photochromic pigments into the monomer composition prior to casting the lens. However, in practice it was found that, following polymerization of the organic material, the photochromic pigments did not retain their photochromic property.

Apparently, the catalyst required for the polymerization caused inhibition of the pigments. Thus, it has not been possible in practice to simply incorporate photochromic pigments into the monomer composition when making ophthalmic lenses from an organic material.

One type of approach to rendering plastic ophthalmic lenses photochromic required embedding a solid layer of photochromic mineral glass within the bulk of the organic lens material. For example, U.S. Pat. No. 5,232,637 (Dasher, et al.) teaches a method of producing a glass-plastic laminated ophthalmic lens structure. A thin, flexible, plastic adhesive layer is applied to a glass element and a monomeric formulation is flowed onto the adhesive layer and cured to form a laminated lens blank. The adhesive layer is a thermoplastic urethane that may be preformed by extrusion as a thin sheet. The sheet may be in the order of 0.13 to 0.63 mm thick, preferably 0.375 to 0.5 mm thick. The sheet may be, by way of example, an aliphatic polyether type urethane available from Thermedics under the designation SG-85A. Other thermoplastic resins such as polyvinyl butyral, 1,4-butane diol, polyetherpolyol and aliphatic diisocynate may be used. However, due to problems with glass-plastic adhesion, differences in the respective thermal coefficients of expansion, and due to contraction of organic materials during polymerization, such lenses exhibited stress fractures in production or could not stand up to extended normal handling by the consumer.

A variation on the glass-plastic composites is taught in U.S. Pat. No. 4,300,821 (Mignen). This patent teaches an ophthalmic lens made of organic material having at least one layer of photochromic mineral glass within its mass to impart photochromic properties to the lens. The photochromic mineral glass has a fibrous structure and may comprise a piece of woven fabric produced from fibers of photochromic mineral glass possessing a refractive index and coefficient of chromic dispersion which are equal to those of the constituent organic material of the lens. However, while such an approach may make it possible to mass-produce photochromic lenses, the approach can not be utilized for the small-scale customized production of prescription lenses on an as-needed basis. It would be cost prohibitive for a medium-sized operation to stock a large number of photochromic lenses of various prescriptions, in addition to the non-photochromic lenses, in order to be able produce photochromic lenses on demand.

Recently U.S. Pat. No. 5,462,698 (Kobayakawa, et al.) entitled "Photochromic Composition" addressed the problems associated with specific photochromic compounds which tend to be slow-acting or inactive when incorporated in plastic, and solved the problem by use of a resin compound having at least one epoxy group in the molecule as the resin for forming the photochromic lens. However, this solution to the problem has limitations and drawbacks. Kobayakawa, et al.) (a) is directed to forming a lens having photochromic compound dispersed throughout, (b) requires the presence of multiple types of photochromic compounds in combination, (c) requires the use of a polymerizable compound having at least one epoxy group to form the lens, (d) requires polymerization in a heat furnace, with polymerization taking from 2 to 40 hours, and (e) reports fading time to ½ density measured after exposure to 60 seconds averaging 3 minutes (Table 1). Kobayakawa, et al. thus uses specific materials and requires a long time to produce a slow acting lens.

More recently, U.S. Pat. No. 5,531,940 (Gupta et al.) teaches methods for making optical plastics lenses with photochromic additives. According to a first embodiment of the invention, a casting resin having a low cross link density comprising polymerizable components (preferably including up to 50 wt % bisallyl carbonate) and photochromic additives, wherein all polymerizable components have a functionality not greater than two, is arranged between a mold and a lens pre-form and then cured. However, upon polymerization, the resin has a low cross-link density and forms a soft matrix. This soft matrix is unsuitable as the outer layer for photochromic lenses. According to a second embodiment of the invention, the casting resin (but substantially free of photochromic additives) is arranged between a mold and a lens pre-form and then cured. The resin is then impregnated with photochromic additives. In a third embodiment, the layering resin containing a photochromic additive is provided on the surface of a mold and cured to a gel state. Then, a casting resin that is substantially free of photochromic additives is arranged between the coated mold and a lens pre-form and cured. According to a fourth embodiment, a casting resin that is substantially free of photochromic additives is provided on the surface of a mold and cured to a gel state. Then, a casting resin containing photochromic additives is arranged between the coated mold and a lens preform and cured. There is no discussion of photochromic rate of reversal, and the photochromic material is represented as being too soft to expose to the environment.

There is thus a need for a method for production of non-prescription or prescription ophthalmic lenses, which method would enable an optometrist to stock a small number of lenses, flexible molds, and glass molds, and allow custom production of plastic lenses of any required prescription including bifocal lenses, progressive lenses, and also capable of rendering the lenses photochromic, tinted, UV-protective, and/or scratch resistant as required by the customer.

SUMMARY OF THE INVENTION

It is an object of the present invention to provide methods for quickly and inexpensively modifying a base lens, generally a stock prescription lens, to a bifocal or multi-focal lens of a different prescription. The invention also makes it possible to produce photochromic non-prescription lenses (Plano lenses, e.g., sunglasses, safety glasses, reading glasses, etc.), as well as prescription, multi-focal progressive or non-prescription plastic or plastic-glass laminate optical quality eyeglass.

It is a further object of the invention to produce lenses characterized by an extremely rapid photochromic response, i.e., a near complete photochromic transition in either direction in about 30 seconds or less.

It is a further object of the invention to reduce the quantity of materials which must be stockpiled in order to carry out the inventive process in a commercial setting, i.e., to be capable of modifying any of the conventional base lenses with a minimum of stock materials on hand.

It is a further object of the invention to provide a method for producing a photochromic lens without requiring casting an optical resin in a lens blank, which process can be carried out by an optometrist in a conventional setting in a matter of minutes.

It is yet another object of the invention to provide customized prescription or photochromic laminated bifocal lenses that are light weight, inexpensive and can be easily formed according to a given prescription from a relatively small number of component lenses maintained in stock.

Furthermore, it is an object of the invention to provide an easy way to customize prescription or non-prescription Polaroid lenses.

Finally, it is an object of the invention to be able to conveniently repair scratched lenses to a like-new state in a short period of time.

These and other objects of the present invention have been accomplished by a method of forming a non-photochromic or photochromic lens according to the present invention, and to the lenses produced by the processes. One significant feature of the vacuum remolding process of the present invention is the treatment of a flexible mold in a manner to render it pliable and deformable, so that it can be deformed under a vacuum suction, and curing of a monomer within to form an otherwise conventional wafer lens that is adhered to a base lens, preferably during a simultaneous vacuum suction deformation step. The monomer can thus be laminated during curing onto a base lens. This is in contrast with the conventional techniques, wherein it had been considered necessary to match the curvature of the base and wafer lens in order to achieve a stress free bonding, or to have the curvatures so close to matching that the interstitial gap would be filled with adhesive during the adhesion step.

That is, previously the deforming of a flexible mold and curing a monomer within to form a wafer lens onto the base lens had not even been considered as an option. The reasons against deforming included concerns over (1) introducing stress which would render the laminate lens product less durable and liable to separation, (2) introducing imperfections, and (3) introducing a change in curvature which would require a further optical correction (i.e., it would have been expected that the precise optical corrections to be imparted by a wafer lens would not be maintained if the wafer lens was deformed). However, the present inventor discovered that optical clarity could, in fact, be satisfactorily achieved if the curvature of the surface of the flexible mold is deformed evenly and to the same degree as the deformation of the curvature of the concave side of the base tool. That is, if care is taken to (1) relax the flexible mold, (2) apply an amount of monomer, (3) apply the proper suction, (4) carefully adhere the base lens to the flexible mold and monomer with application of even pressure from the base lens and suction, and (5) allow the monomer to harden; the product is a lens with a bifocal of which the optical properties are the sum of the optical properties of the base lens and the monomer.

The vacuum mold process makes it possible to eliminate the need for wafer lens by using the flexible mold in the formation of a wafer lens over the base lens. The vacuum mold process utilizes a flexible mold having a thickness of 2.2 mm. The flexible mold has a negative impression and can receive 18 to 30 drops of a monomer. The monomer is allowed to cure onto a base lens while the flexible mold is maintained in a deformed orientation within a base tool. Curing the monomer onto a stock base lens as conventionally stocked by any retailer of eye glasses differs from the conventional process primarily in that, in the present invention, the wafer lens is formed directly onto the base lens during the curing process.

A significant feature of the rigid remolding process of the present invention is the creation of a wafer lens within a cavity created between a stock lens and rigid mold that have matching concave surfaces. Specifically, a stock lens of a curvature that is pre-determined by the prescription, is selected. Then a rigid mold, preferably a glass mold, with a matching concave curvature, is selected so that these two curvatures match when put together. The glass mold is first seated on a support surface. Next three tabs are positioned an equal distance about the perimeter of the concave surface of the glass mold. The stock lens convex surface is placed in the concave surface of the mold and rest upon the tabs to form a cavity between the stock lens and glass mold. A monomer is then injected into the cavity and cured by using ultra-violet radiation, 265–350 nanometers or can be cured by visible light with a visible catalyst added to the monomer. When the curing time is over, the stock lens is removed and the cured monomer forms the wafer lens that remains attached to the glass mold. The three spacing tabs are removed and an optical adhesive is placed in the center of the concave surface of the newly formed wafer. The stock lens is placed back onto the convex surface of the newly preformed wafer lens so to make contact with the adhesive. The adhesive, by a process of capillary action and its own weight, spreads out evenly toward the edge of the lens. The assembly of lenses, stock lens, newly formed wafer lens and glass mold are flash cured with ultra-violet or visible light. In effect, this very quick curing adhesive in between the formed wafer and the pre-formed stock lens adheres the newly formed wafer lens to the stock lens. Once adhered, the wafer lens is very easily de-molded from the glass. Then you have a stock lens that has now been transformed into a prescription or non-prescription lens of optical quality.

In accordance with the processes of the present invention, it becomes possible also to impart photochromic properties to the prescription or non-prescription lenses. That is, either (1) a specially formulated photochromic compound-containing monomer is used during the curing process when laminating to the base lens or curing within the glass mold, or (2) a photochromic pigment is impregnated into the inside (contact side) of the monomer, or (3) a photochromic base lens is adhered to the monomer, or (4) a Polaroid may be transformed into a bifocal/multi-focal prescription or photochromic lens, or (5) another technique as described below, or in previous technical literature is employed.

The photochromic layer, if any, in each process is preferably provided near the front surface of the lens, i.e., the surface of the lens most exposed to UV radiation. As a result, the photochromic layer tends to have greater sensitivity to changes in ambient radiation. That is, many lenses, particularly those designed to be worn outdoors, include UV absorbers to block damaging UV rays from reaching the retina. UV absorbers naturally absorb UV radiation, and in doing so, interfere with and retard the photochromic action of the lens wherein the photochromic pigments are designed to react to UV radiation. That is, photochromic pigments located behind UV absorbers are less likely to be effective, while the photochromic pigments arranged on the front surface of the lens according to one variation of the present invention are fully exposed to UV radiation and are highly sensitive and reactive. Of course, the present invention is not limited to such a construction, and in certain cases, such as the case of having an uneven bifocal lens front surface, it may be more advantageous to adhere a photochromic wafer lens to the back or concave surface of the base lens.

The formation of the wafer lens during the curing process according to the present invention makes it possible to create every possible prescription, to optionally tint lenses, and to optionally render lenses photochromic. The inventor has discovered how to incorporate photochromic pigments within the monomer layer to create photochromic composite lenses without inhibition of the photochromic materials. The problem of photochromic pigments gassing out or leaching out through coating materials is also solved, since the photochromic pigment is sealed in during the formation of wafer lens onto the stock lens, or between the stock lens and the rigid mold. This process is also useful for creating photochromic single vision lenses by taking a single vision base lens and applying phochromic monomer during the rigid remolding process.

The main advantage of the present invention lies in the ability to take stock lenses of any power and make them into bifocals in very little time; and, therefore, saving a very significant amount of money per lens. Further, it is possible herewith to create bifocals from stock polycarbonate lenses in about half a minute using a flash curing process as described below. Furthermore, it is possible herewith to create bifocals/multi-focal lens from Polaroid stock lenses. In contrast to traditional lens casting methods, the methods of the present invention provide lenses relatively quickly and at significantly less cost. Using ultraviolet light curing, curing requires approximately 25 to 30 seconds, no surfacing is required, and the entire process including edging and finishing may be completed in 30 minutes or less. Thus, the present invention provides means for producing optical quality multifocal lenses in approximately ½ hour or less, starting with any of an array of stock lenses and, depending upon the embodiment, wafer lenses, monomer, and glass mold, and ending with the finished lens in the frame. This allows delivery of a full selection of prescription lenses from small stocks upon request and without having the patient wait a significant time. This is obviously a tremendous commercial advantage.

BRIEF DESCRIPTION OF THE DRAWINGS

In order to facilitate an understanding of the invention, the invention will be discussed with reference to the drawings, wherein there is shown.

DETAILED DESCRIPTION OF THE INVENTION

In manufacturing lenses, and particularly lenses for eyeglasses, the use of plastics is desirable due to their light weight and durability. Plastic lenses also provide relatively economical vision correction. Methods for producing plastic base lenses of various prescriptions are well known and need not be further described herein.

Figure 1:
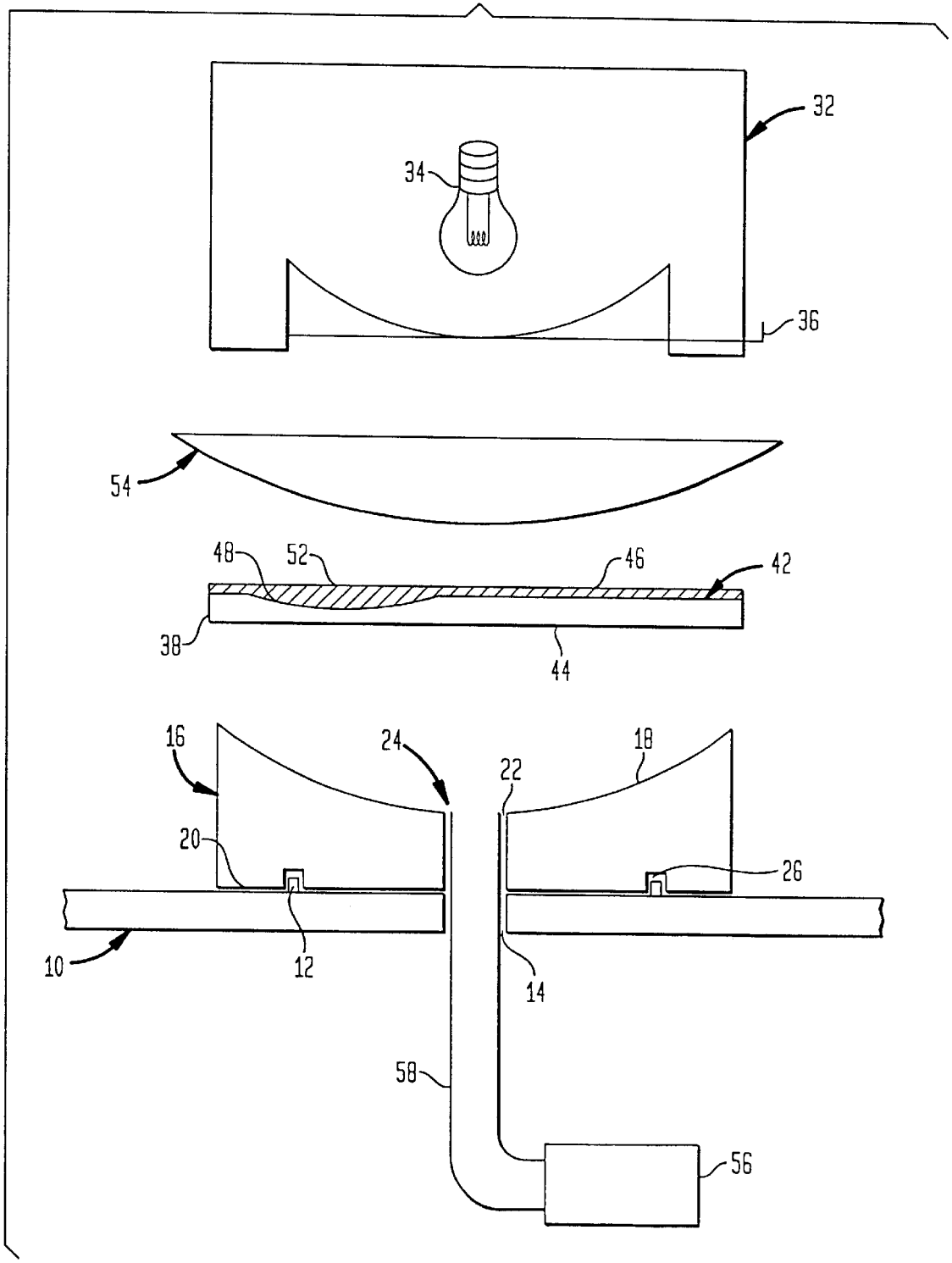
FIG. 1 is an exaggerated diagram showing flexible mold with liquid monomer composition prior to seating of prescription base lens and placement within the base tool.

The present invention is concerned with the formation of a wafer lens by either a vacuum remolding process or a rigid remolding process. The major components of the present invention include a stage, a base tool, a flexible mold, a rigid mold, a base lens, and an ultra violet lamp. In the vacuum mold process, the stage 10, as shown in FIG. 1, has a pair of support pins 12, with each projecting upwardly from the stage. Formed in the stage is a stage opening 14.

Figure 2:
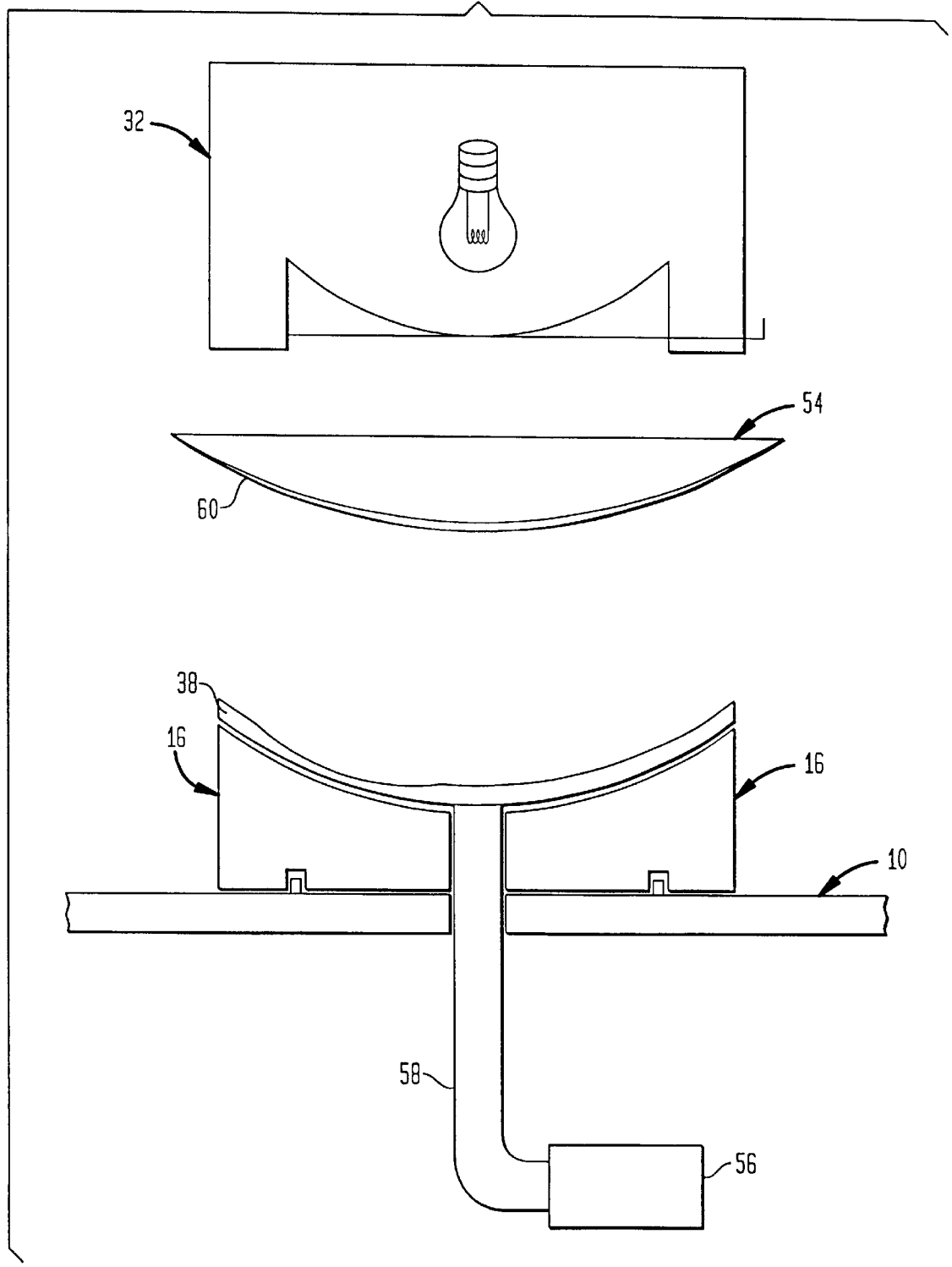
FIG. 2 corresponds to FIG. 1, but in the final step with the flexible mold remaining in the base tool, and the monomer hardened onto the base lens.

Also, a generally rectangular base tool 16 is provided. The base tool is made of a rigid plastic. The base tool has an upper side 18 and a lower side 20. The upper side is a concave seat and has a central opening 22. The central opening defines a passage 24 that passes through the base tool. The lower side of the base tool has a pair of slots 26 that project into the base tool. In FIGS. 1 and 2, the base tool is shown seated on the stage with the pair of slots engaged by the pair of support pins. The passage is aligned with the stage opening when the slots of the base tool are engaged by the support pins. Preferably the engagement of the slots and support pins will provide securement for the base tool when positioned on the stage.

A light housing 32 is included and has a light source 34. The light housing in FIG. 1 has a movable light guard 36 to control the emitting of light. The light source can be an ultra-violet lamp or any lamp that emits visible light at the desired frequency. The lamp shines constantly, and the light guard controls the exposure of the light beams to various objects. When it is time to allow the lamp to shine on an object, the light guard is pulled away from beneath the lamp. It is possible to have the light source controlled by a switch with a timer.

As best illustrated in FIG. 1, a generally flexible mold 38 is provided. The flexible mold has a disc shape. The flexible mold has a first side 42 and a second side 44. The first side has a flat portion 46 and a negative impression 48. The second side 44 is completely flat. The flexible mold is "CR-39," which is a trademark of PPG Industries with mixtures selected from the group consisting of triallyl cyanurate, triallyl phosphate, triallyl citrate, diallyphenyl phosphonate, acrylic esters, acrylates, methyl, allyl and butyl methacrylates, polycarbonates, styrenics, LEZAN and polyesters.

Additionally, a monomer 52 is provided. The composition of the monomer is discussed later in this application. An amount of monomer is placed along the first side and within the negative impression of the flexible mold. The flexible mold is heated and seated within the base tool 16.

A stock lens 54 is included and positioned on the monomer within the flexible mold. The stock lens or base lens is made of any plastic (organic) polymer conventionally available or as disclosed in the patents discussed in the background or detailed sections of the present application, the disclosures of which are incorporated herein by reference.

For the operation of the vacuum mold, a vacuum motor 56 is included. The vacuum motor has an elongated vacuum tube 58. As depicted in FIG. 1, the vacuum tube projects outwardly from the motor. Additionally, the vacuum tube is sized for engaging the stage opening and the passage of the flexible mold. The vacuum motor, when turned on, creates a suction force through the vacuum tube and pulls the heated flexible mold 38 into the base tool, as shown in FIG. 2. Once suction is applied, the flexible mold is sucked into the base tool and becomes deformed. The monomer and the base lens remain in position as the base tool is suctioned into the base tool.

The force of the suction causes the concave surface of the flexible mold to deform to the convex curve of base lens. The monomer is laminated about the base lens, when the flexible mold is suctioned into the base tool to develop the wafer lens through a slow cure. Once cured, the stock lens is removed from the newly formed wafer lens and a predetermined amount of ultra-violet or visible light curable adhesive is introduced. During this process, the flexible mold remains sucked into the base tool. The stock lens is repositioned on the newly formed wafer lens and evenly spreads the adhesive with capillary action or the stock lens' weight. The combination of the stock lens, adhesive, and wafer lens are cured again via flash curing when the light guard is pulled away from the lamp and allows the ultraviolet lamp to shine onto the stock/base lens. The rays from the lamp cause the monomer to cure and laminate for casting onto the stock lens, as seen in FIG. 2, to form the wafer/multi-focal lens 60. Casting the monomer onto the base lens forms an optical quality eyeglass lens.

Finally, removal of the flexible mold from the base tool only requires the turning off of the vacuum motor. When the motor is turned off, the flexible mold returns to its original shape, and the newly formed eyeglass lens may be removed.

Further, in accordance with the present invention, a pre-manufactured flexible mold, preferably a 6 base curve having a thickness of 2.2 mm and a diameter of 80 mm, is filled with a diethylene glycol diallyl carbonate monomer and suctioned into the base tool, wherein the pre-manufactured stock lens is placed onto the monomer and the monomer is cured onto the stock lens to produce the finished lens.

By allowing the monomer, within the base tool with a negative impression, to harden onto the stock/base lens after the adhesive is applied and the two lenses are flash cured, a myriad of lens designs can be achieved quickly and inexpensively. Curing the monomer forms a wafer lens that will adhere to the base lens. The base lens is then adhered to the wafer lens via an ultraviolet curable adhesive during flash curing for about 5 seconds.

Furthermore, by curing the monomer placed in a flexible mold that has a negative impression of a progressive type, about the surface of the stock lens, myriad lens prescriptions can be achieved quickly and inexpensively. The flexible mold containing the multi-focal or progressive region in the form of a negative impression can allow the monomer to be cured onto the preformed lens with the addition of an ultraviolet adhesive and placement under ultraviolet lighting.

Figure 3:
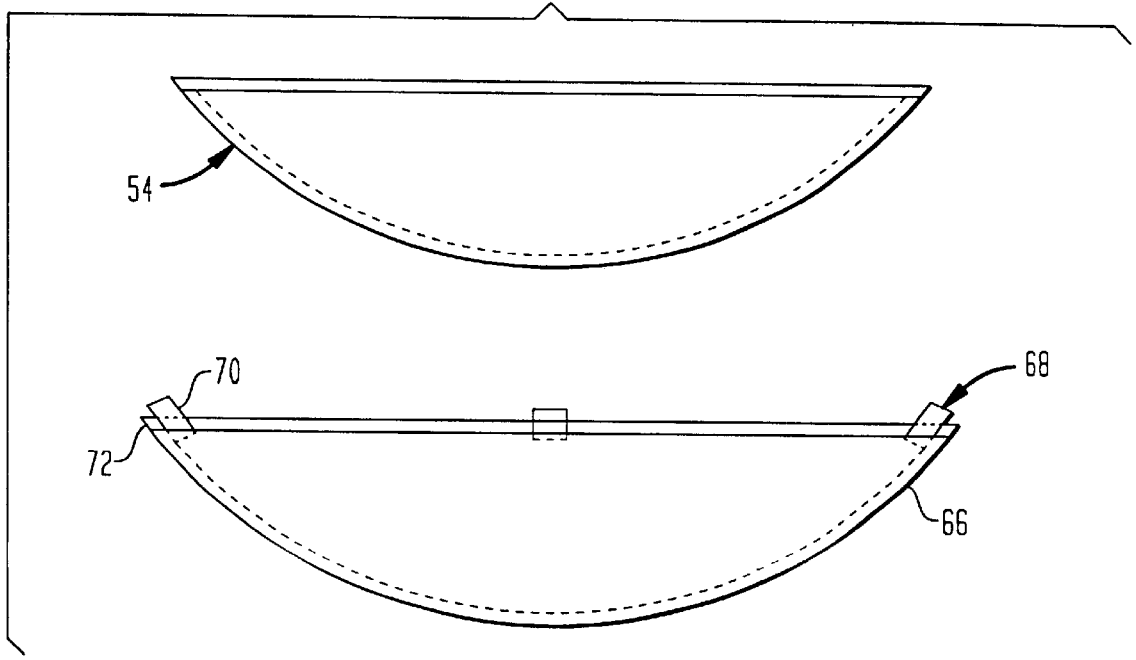
FIG. 3 is a side view of the stock lens and the glass mold in a pre remolding orientation.

In the rigid remolding process (RRM), a base lens/stock lens is used in conjunction with a rigid mold 66, as shown in FIG. 3, to form the wafer lens. The rigid mold is preferably a glass mold but can be a plastic mold.

This process, like the vacuum mold process, is useful for creating photochromatic single vision and photochromatic progressive and clear progressive lenses from pre-existing stock lenses with single vision power although it does not use a flexible mold. It uses rigid molds or tools.

The process is a two-step process. You start with a stock/base lens of a curvature that is pre-determined by the prescription. Net a rigid mold 66 with a matching concave curvature is selected. The mold with the matching curvature is selected so that the curvatures of the stock lens and the mold match when you put them together. The mold is placed on a support surface (not shown). Once the rigid mold is placed on the surface, 16 drops of the monomer may be placed on the upper surface of the rigid mold, or double-sided adhesive spacing tabs 68 are inserted an equal distance on the perimeter of that concave surface of the mold. When it is important to control the thickness of the wafer lens, the spacing tabs are used. When the thickness of the wafer lens is not important, the monomer is placed directly within the rigid mold prior to positioning the stock lens within the rigid mold.

If the spacing tabs are used, two to three spacing tabs are positioned about the upper surface of the rigid mold. A first adhesive side 72 of the spacing tabs holds the spacing tabs about the concave surface of the glass mold. The convex surface of the stock lens 54 is positioned in the concave surface of the mold. The stock lens adheres to the second adhesive side 70 of the spacing tabs. This allows the three adhesive tabs to have a dual purpose. The first purpose is to separate the stock lens from the mold. The second purpose is to keep the stock lens from floating up while the monomer is injected into a cavity formed between the stock lens and the glass mold. During curing of the monomer within the cavity, a floating stock lens will cause aberration and destruction in the newly formed wafer lens.

Figure 4:
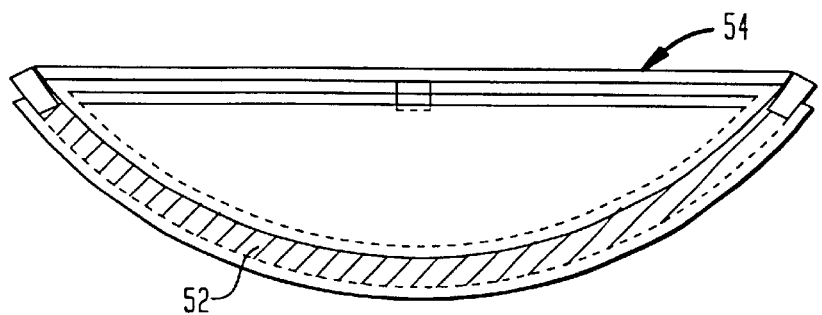
FIG. 4 is a side view of the operable orientation of the stock lens within the glass mold of FIG. 3.
Figure 5:
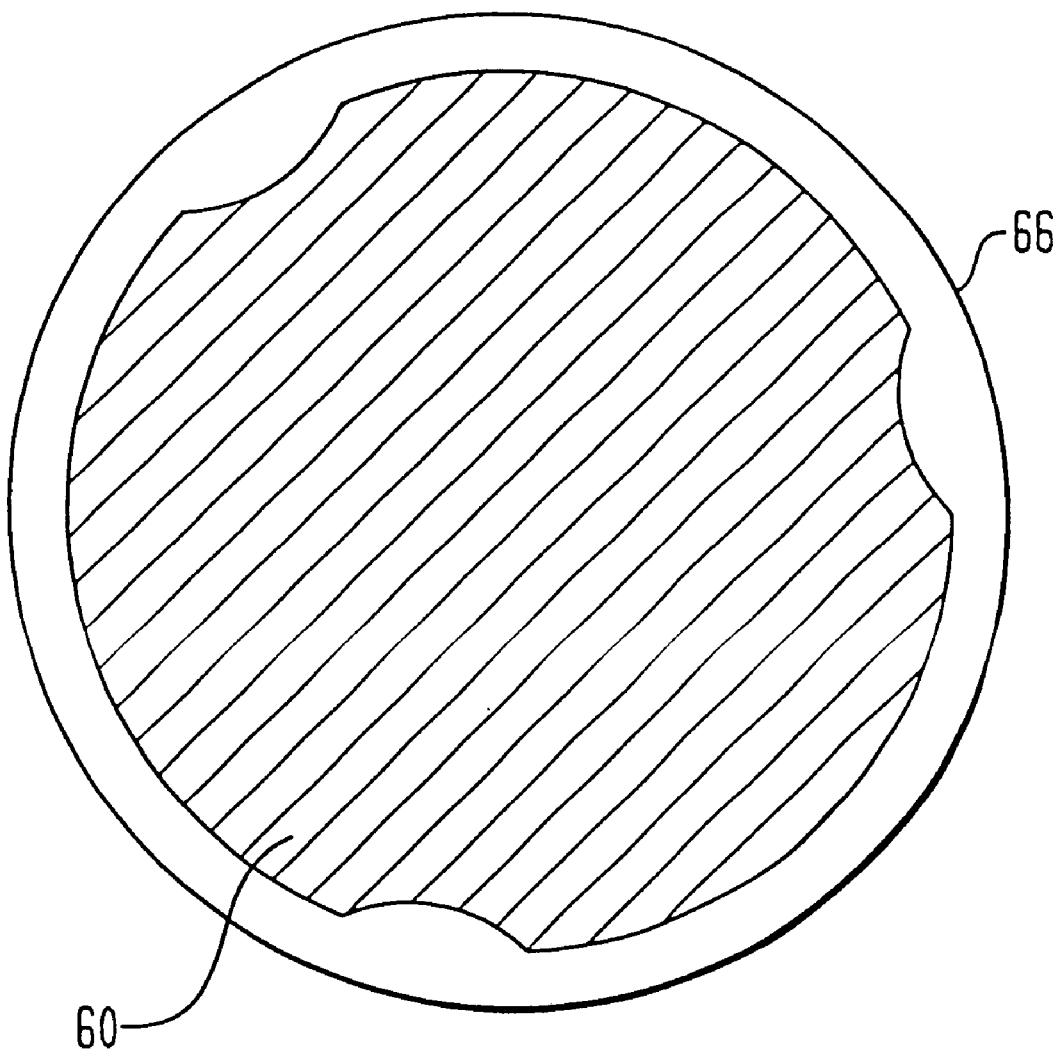
FIG. 5 is a top plan view of the glass mold with the wafer lens formed from the cured monomer.

The monomer 52, shown in FIG. 4, injected into the cavity can be a clear monomer, or it may contain photochromic pigment as described below. Once the monomer has been injected into the cavity, it is slow-cured by using ultra-violet radiation at a range of 300–425 nanometers for 15 to 35 minutes. A clear monomer takes about 15 minutes. A monomer containing a photochromic pigment takes from 25 to 30 minutes to cure. When the curing time is over, the monomer cured between the cavity has formed the wafer lens 60, shown in FIG. 5.

Before the wafer lens can be laminated onto the stock lens, adhesive has to be added. To do this, the stock lens 54 has to be removed from the wafer lens 60 and glass mold 66. Removal of the stock/base lens is accomplished with a plastic, kind of wedge shaped, spatula type tool. Once the stock lens is removed, you have the cured monomer, newly formed wafer lens, still attached to the glass mold. The spacing tabs are removed, and the concave surface of the wafer lens is cleaned. An optical adhesive, that contains an ultra-violet photo initiator for a catalyst to aid in the ultra-violet radiation curing process, is added. Approximately between 0.2 and 0.6 ml of adhesive is placed in the center of the concave surface of the newly formed wafer lens. The convex surface of the preformed prescription stock lens is placed into the adhesive contained within the concave surface of the wafer lens. By a process of capillary action and with the weight of the stock lens, the adhesive is spread out evenly toward the edge of the wafer and stock lenses. A smooth layer of adhesion, having no aberration and destruction, is formed because the curves of the lenses are en exact match. Specifically, they match because the stock lens was sued to cast the wafer lens surface to create the monocular level exact match.

When the adhesive has completely spread between the stock lens and wafer lens, the entire assembly will be flash cured. Flash curing occurs at a very, very high intensity of ultra-violet radiation for a period of 5–10 seconds. The flash curing occurs through the glass mold from the bottom up. Curing from the bottom up is going to quickly cure the adhesive in between the formed wafer and the pre-formed stock lens. After the curing period of 10 seconds, it is very easy to de-mold the wafer lens from the glass mold 66. Then you have a stock lens that has now been transformed into a photochromic stock lens or a progressive lens. The rigid glass mold determines whether a single vision photochromic lens, a progressive lens or a photochromic progressive lens is made during the process. Therefore, it doesn't matter whether you use a rigid glass bifocal mold or a clear mold as long as the curvature of the concave surface of the rigid mold matches exactly the curvature of the convex surface of the stock/base lens.

Furthermore, Polaroid lens can be used as the stock lens to create progressive Polaroid lenses. In order to create a Polaroid lens, you would take the preformed stock lens and match the curve of the stock lens with the concave surface of the rigid mold. Then, you would select a matching Polaroid lens with a curve matching the stock lens. The matching Polaroid lens is attached to the convex surface of the stock lens prior to flashing and curing it onto that stock lens, and prior to the remolding of the wafer lens. In other words, you would sandwich a Polaroid wafer in between the stock lens, and then you would have a Polaroid in the middle, and the wafer lens as the progressive in the front. Also, you can take a final rigid photochromic Polaroid as the stock lens and place it on the rigid progressive and you would turn the Polaroid lens into a bifocal.

For example, you take a 6 curve Polaroid lens, and then you put that Polaroid lens with a matching curve on a rigid progressive mold. You incorporate the spacing tabs prior to assembly so to create a cavity. Then, you inject the clear monomer into the cavity. What is created instead of just a Polaroid lens, is that it has that layer of clear monomer with the bifocal when the rigid remolding process is complete.

This is one of the advantages of this system. It does Polaroids.

The polymerizable composition for forming the wafer lens, through curing of the monomer about the base lens in either the vacuum mold process or the rigid re-molding process, will now be discussed in greater detail.

Polymerizable Compositions

The most common monomer utilized to produce either or both of the wafer and stock optical plastic lenses is diethylene glycol diallyl carbonate (DAC), marketed by AKZO Chemicals, Inc. of Dobsferry, N.Y. and PPG Industries, Inc. of Pittsburgh, Pa. under the trademarks NOURYSET 200™ and CR-39™, respectively. This monomer is widely accepted due to the clarity, strength, impact resistance, resistance to discoloration, and resistance to physical warping or distortion of products made therefrom. However, the present invention is not limited to this composition. U.S. Pat. No. 5,422,046 (Tarshiani, et. al.) teaches a method for casting plastic lenses having a refractive index higher than the lenses made of the conventional DAC monomer, and such lenses are within the contemplation of the present invention.

The present invention contemplates any other preformed "plastic" base or wafer lens regardless of the composition or manner in which such lens was formed. As used herein, a "plastic" lens is simply one fashioned from optical quality resin materials. Such materials include without limitation mixtures containing allyl diglycol carbonates (such as "MasterCast 1" and "MasterCast 2" which are trademarks of Vision Sciences, Monrovia, Calif.; and "CR-39" which is a trademark of PPG Industries), allylic esters such as triallyl cyanurate, triallyl phosphate, triallyl citrate, diallyphenyl phosphonate, acrylic esters, acrylates, methyl, allyl and butyl methacrylates, polycarbonates, styrenics, LEXAN, polyesters such as those formed of ethylene glycol maleate, and other liquid monomer/polymer materials having high indices of refraction (such as HiRi which is a trademark of PPG Industries). Preferred resin compositions include allyl diglycol carbonates, allylic esters, triallyl cyanurate, triallyl phosphate, triallyl citrate, diallyl phenyl phosphonate, acrylic esters, acrylates, methyl methacrylate, allyl methacrylate, butyl methacrylate, polycarbonates, styrenics, LEXAN, polyesters, high index plastics, medium index plastics, urethanes, epoxies and silicones.

It is, however, possible to use a wide variety of UV-polymerizable monomers for preparing the wafer lens and stock lens used in the present invention. It is preferred that the liquid monomers comprise at least one ethylenic unsaturated compound having at least two unsaturated groups per molecule. It is most preferred that the liquid monomers further comprise at least one polythiol compound having at least two thiol groups per molecule.

Typical examples of the unsaturated ethylenic compounds include ethylene glycol dimethacrylate, proplylene glycol dimethacrylate, trimethylene glycol dimethacrylate, tetramethylene glycol dimethacrylate, polyethylene glycol dimethacrylate, trimethylolpropane triacrylate, pentaerythritolpropane trimethacrylate, ethoxylated bisphenol A diacrylate, 1,6-hexanediol dimethacrylate, urethane diacrylate, epoxy diacrylate, eiallyl phthalate, and divinyl benzene.

Examples of polythiol compounds include 1,2,3-trimethylolproplane tri(thioglycolate), pentaerythritol tetra (thioglycolate), pentaerythritol tetra(3-mercaptopripionate), 1,2,3-trimethylolproplane tetra(3-mercaptopripionate), thioglycerol, dithioglycerol, trithioglycerol, dipentaerythritol hexa(2-mercapto acetate), and 3,4,5,6-tetrachloro-1,2-dimercapto benzene.

Many different ratios and proportions of monomers may be used in formulating the polymerizable composition. In one composition, ethylenic unsaturated compounds having at least two unsaturated groups per molecule comprise about 60–99.995% by weight of the polymerizable composition, polythiol compounds having at least two thiol groups per molecule comprise about 0 to 40% by weight of the composition, and photo-initiators comprise about 0.005 to 2% by weight of the composition.

According to current manufacturing processes, the monomer composition is fixed with free radical initiator, such as diisopropyl peroxy decarbonate. The photo-initiator is not particularly limited and may be, e.g., 1-hydroxy-1-cyclohexyl phenyl ketone, 2-hydroxy-2,2-dimethyl acetophenone, benzoin, benzoin methyl ether, benzoin propyl ether, benzoin isobutyl ether, 2,4-dihydroxy benzophenone, benzophenone, benzyl, and 2,4,6-trimethylbenzyl diphenyl phosphineoxide.

Molding and Polymerization

To manufacture a wafer lens or a base lens from the monomeric composition, the lens forming materials are injected between, for example, a pair of glass mold shells or sections that are sealed by a gasket and held together by a spring clip or other suitable fastener. One mold shell has a molding surface having the profile of the front face which is to be obtained for the desired ophthalmic lens. The molding surface is generally concave for forming the convex outside surface of the lens. The mold shell is preferably made of glass, and, in particular, toughened glass. However, molds can be made from any material that will provide an optimum quality surface when used for casting such as, Crown Glass or Electro-Formed Nickel. Methods of making molds and for fastening such molds for use in accordance with the present invention are well known in the art and need not be described herein.

In the present invention, a wafer lens is cast by, taking an optical resin monomer and dispensing it into a flexible mold made from CR 39. The wafer lens can even be produced from a material traditionally used to hard coat lenses such as described in U.S. Pat. No. 4,758,448 or U.S. Pat. No. 4,544,572, incorporated herein by reference, thus providing not only the desired correction but also providing a durable surface. Hard coat materials can also be blended with other resins, or the lens can be a composite of high index plastic materials and more scratch resistant materials.

The methods of the present invention can be used to add a multi-focal or progressive region to the front of the base lens surface. Preferably, for bifocal prescriptions, the wafer lens formed when cast onto the base lens is used to change the curvature of the base lens over only a small portion of a surface of the preformed base lens to form an "optical segment". However, the methods of the present invention can be used to form lenses of almost any prescription including multi-focal or progressive optical configuration including, without limitation, bifocals, trifocals, and progressive lenses.

It is also possible to cast a wafer lens onto a base lens that does not alter the optical properties of the lens, but merely serves as an external shell for retaining photochromic adhesive materials within the lens, or for repairing a scratched or scuffed lens surface.

In manufacture of the base lens, the charged mold assembly is then heated or, more preferably, exposed to ultraviolet radiation to cure the resin. The ultraviolet light used in the curing process can be selected from any suitable source, including low, medium, or high pressure mercury lamps, laser, xenon, luminescence such as fluorescence or phosphorescence, and the like. Specific examples of ultraviolet light sources include a fluorescence Spectroline Model XX-15A, made by Spectronics Corporation of Westbury, N.Y. This light source generates most spectra output from 340 to 380 nm.

Separation of molds from the resultant lens wafer or stock lens blank can be facilitated by putting the assembled apparatus on ice or in some other cold source (e.g. FREON). The exposure to cold causes the resultant lens and molds to contact and pull away from each other such that the components can be more easily separated.

In the present invention, the charged flexible mold is heated to about 190 degrees Fahrenheit. The heating may be done thermally and would take 60 seconds. The preferred method is to us inferred heating at 190 degrees Fahrenheit for 30 seconds. Heating the flexible mold causes it to become pliable and deformable. The flexible mold is then placed on a base tool that is coupled with a vacuum tool. Suction is applied to the deformable flexible mold, and it deforms into the curvature of the concave seat of the base tool. A base lens is then placed onto the monomer, and ultraviolet light is used in the curing process and selected from any of the sources listed above. Also, visible light can be used to cure both monomer and adhesive by using a visible light catalyst in the liquid and allowing it to be exposed to visible light source.

Reversible Photochromic Compounds

Reversible photochromic compounds (i.e., compounds which darken when exposed to intense sunlight or UV radiation, and revert to a colorless state when not irradiated), hereafter simply referred to as photochromic compounds, which can be used in the present invention include any reversible photochromic compounds as employed in this art, including for example napthopyran compounds and other photochromic compounds as taught in U.S. Pat. Nos. 5,458,815; 5,458,814; 5,466,398; 5,384,077; 5,451,344; 5,429,774; 5,411,679; 5,405,958; 5,381,193; 5,369,158; 5,340,857; 5,274,132; 5,244,602; 4,679,918; 4,556,605; and 4,498,919, the disclosures of these patents being incorporated herein by reference.

In accordance with the present invention, the layer of photochromic pigments is preferably provided closer to the front face of the ophthalmic lens than to the rear face, so that the ultraviolet radiation reaching the photochromic layer has retained as much of its energy as possible, and the external radiation can have the maximum effect on the photochromic pigments present in the layer. Visible light curing eliminates harming photochromics with ultra-violet radiation.

Furthermore, while UV absorbers may conventionally be added to either the monomer or the stock base lens, in order to obtain the rapid photochromic reaction rate according to the present invention, any agent which is capable of filtering the ultraviolet rays as preferably not incorporated externally of the layer containing the photochromic pigments, but is either mixed into the layer containing the photochromic pigments or is provided inside the layer containing the photochromic pigments.

Ultraviolet curing also allows use of tinting agents in the photochromic layer which would be otherwise be decomposed or volatilized if a thermal curing processes were employed. If UV curing is used, in most cases, tinting agents can be added to the photochromic styrenic monomer layer before curing and incorporated relatively uniformly into the resulting photochromic layer.

The photochromic material may alternatively be transferred to the stock base lens using an impression transfer technique wherein a plastic film is coated with photochromic material, dried and then applied against or adhered to the lens.

Plastic Films

A variety of plastic films may be utilized for transference of photochromic compounds, but the most readily available films are comprised mainly of polyethylene. Polyethylene can be easily blended or co-extruded to produce various extensibilities, controlled stretch, and strength. Today, most films are multi-layer materials, with the overall properties of films being determined by one or more layers of polymer, and the additives, such as cling agents, tackifiers, or slip agents.

There are two main varieties of polyethylene: low density (branched) and high density (linear). These varieties have low levels of stretch. LDPE is produced by the high-pressure polymerization of polyethylene, and has a density of 0.91–0.92 g/cc. LDPE is highly flexible. LDPE may also be formed by bulk or solution methods. HDPE is produced by two methods: (1) coordination polymerization of the monomer by triethyl aluminum and titanium trichloride (Ziegler-Natta catalyst), and (2) polymerization with the help of metal oxide catalysts such as chromium or molybdenum oxides. HDPE has a density as high as 0.96 g/cc, and has high tensile strength and stiffness. HDPE is denser because the more regular chain structure allows closer chain packing and a higher degree of crystallinity.

LLDPE (linear low-density polyethylene) is actually a copolymer of ethylene and 1-butane (with lesser amounts of 1-hexene and higher 1-alkanes to vary the density) manufactured with Ziegler-type catalysts. LLDPE has high levels of stretch an strength. More recently, VLDPE (very low density polyethylene) has been developed.

Other types of film materials include polyvinyl chloride, polyvinyl alcohol, ethylene vinyl acetate, and acrylics, and blends. Any type of soft, pliable plastic film can be used for this application. A particular embodiment would be the use of low density polyethylene which is soft enough so that the film will take the shape of the lens curvature upon application of a small amount of hand pressure.

Photochromic Material

The photochromic material of the invention is plated onto the lens through the use of a bath. The bath is a mixture of a monomer solvent such as trichloroethylene and methylene chloride (for purposes of the present invention, even though trichloroethylene may be a polymerizable monomer, trichloroethylene is used as a solvent) and photochromic dyes. The solvent mixture breaks down the photochromic material and therefore creates the solvent bath.

When a lens is immersed according to the present invention, it is highly preferred that the surface or surfaces being coated are not in contact with the device carrying the lens. That is, if the front surface is being coated, a rubber vacuum nozzle may be attached to the back surface of the lens. If both surfaces are being coated, it is preferred that a gripper be used to hold only the edges of the lens without holding the sides of the lens. In practice, it has been found preferable to hold the lens by its edges even if only one surface of the lens is being coated. If the lens is merely coated and laid down, the solvent and dye composition may flow during drying, forming a slightly darker rim around the edge of a convex-up drying lens, or forming a darker center in the case of a concave-up drying lens. If the lens is laid against its side, there may be a darker rim at the contact point. Accordingly, to avoid possible problems and guarantee even drying, it is preferred to use a device that grips the lenses only at their edges and hangs the lenses up to dry. Hanging lenses in the air has been found to virtually guarantee lens drying free of dark rims, most likely because the solvent will evaporate evenly over the entire surface of the lens. In use, the bath formed by the mixture of solvent and photochromic dye allows for an even distribution of the photochromic crystals over both convex and concave surfaces upon drying of the solvent.

In the drying, step the solvent evaporates within seconds, and it can be observed that the photochromic dye forms small, barely visible crystals on the surface of the lens. The dye crystals appear not to be absorbed into the lens material. The lens is heated at 190°–210° centigrade for 8–10 minutes after the solvent has dried. Heating of the lens causes the surface of the preformed lens to soften. Once the surface of the preformed lens is softened, the surface will allow the crystals to be accepted within the soft surface. Acceptance of the crystals into the soft surface of the preformed lens traps the crystals in the first layer of both the convex and concave surfaces to plate those surfaces with the photochromic material. The unique feature of the lens, tinted by this bath system, is the even distribution of highly active photochromic crystals over the surface of the lens, with such good adherence that no overcoating layer is needed.

The amount of photochromic dye dissolved in the monomer is not critical and can easily be determined by the person of ordinary skill depending upon the chemical solubility of the photochromic dye and the specific solvent. The plating material is preferably formulated in a ratio of 1 gram of solids (dyes) and 2 ounces of the solvent (e.g., as trichloroethylene and methylene chloride).

The plated amount of photochromic pigment can be any desired amount depending upon the desired final appearance and light transmissivity characteristics of the lens. When prepared according to the present invention, the photochromic pigment is not inhibited following.

Pressure-Deformation Adhesion Step

In the step of forming the composite wafer lens, the monomer 52 is placed on the upper side of a flexible mold 38 preferably oriented generally horizontally to present a flat appearance with a negative impression facing upwards. The flexible mold is heated to about 190 degrees F. for between 30–60 seconds to soften the mold and render it more pliable. An amount of the monomer, which may have a photochromic styrenic monomer thereon according to the present invention, is then placed in the negative impression recess and along the first side of the flexible mold. The preformed stock base lens 54 is cleaned with alcohol as conventional in the industry, and the clean base lens is placed on top of the monomer within and on the flexible mold. The pliable flexible mold is seated on the base tool. A vacuum motor is turned on, and the pull of air down through the vacuum tube creates a suction force that pulls the pliable flexible mold downward. Once the flexible mold is pulled downward into the base tool, it becomes deformed and cups the stock lens. The light guard 28 is pulled and allows the ultraviolet light to shine onto the stock lens, the monomer, and the deformed flexible mold. The weight of the base lens causes the monomer to be laminated thereon. The ultra violet light cures the laminated monomer causing it to form a wafer-like lens cast on the stock base lens. The lens and mold are held tightly together during the curing step as discussed below.

Although optical segments can be placed in any location on the lens, for normal applications, the optical segment should be properly located to avoid adverse prismatic effects. Optimally, an optical segment should be positioned approximately 1.5 mm left or right and 3–5 mm down from the optical center of the lens for normal eyeglasses. In certain applications, such as workman's glasses for close vision above the wearer's head, the optical segment can be optimally located approximately 1.5 mm left or right and 3–5 mm above the optical center of the lens. Other locations of the optical segment can also be used as long as the optical center and the segment are properly aligned. The optical center can be moved or displaced by physically moving the optical center of the preformed lens to align with the desired location just above the edge of the multi-focal region in the case of a multi-focal lens or to the proper mold position in the case of a progressive lens, then adhering two lens surfaces. In some lens designs, adjustment must be made to accommodate astigmatism in the prescription of the finished resulting lens. In such cases, the preformed lens must be rotated with respect to the flexible mold to a degree corresponding to the proper astigmatic axis. The preformed lens and flexible mold can either be contacted at the proper angle or can be rotated with respect to each other after contact. The preformed lens can optionally be provided with approximate markings for determining the proper astigmatic axis.

Most materials, used for the monomer, can be cured by exposure to heat or ultraviolet radiation ("UV"). Other curing methods may include without limitation ultrasound, infrared, microwave and other forms of radiation, or visible light. Thermal initiators (such as diisopropyl peroxydicarbonate) and/or UV initiators (such as 2-hydroxy-2-methyl-1-phenyl-propan-1-one or 1-hydroxycyclohexylphenylketone) are mixed with the optical resin material before it is used. Suitable UV light sources include those manufactured by Phillips Corporation and identified as TL/10R/UVA reflector lamps, HPM high pressure halide lamps, HPA medium pressure metal halide lamps and HPR high pressure mercury vapor lamps. In preferred embodiments, the UV source (300–450 nm) is applied during the curing process until the resin hardens sufficiently (approximately 5–30 seconds). In some cases, the lenses to be cured are placed onto a turntable for rotating the lenses through the stream of incident radiation in order to achieve more even curing and maximizing the number of lenses which can be cast within a given area. Other appropriate UV light sources and conditions for exposure will depend upon the resin composition employed and will be apparent to those skilled in the art.

Photochromic Stock Base Lens

The base lens may be a photochromic glass base lens as conventionally known, or may be a plastic photochromic lens as developed by the present inventor, or it may be a Polaroid lens. The clear lens is cast from a composition comprising a major proportion tripropylene glycol diacrylate such as that available under the tradename SR-306 from The Sartomer Company. The composition also includes from 0.3 to 1.0, preferably 0.53 to 0.6, most preferably 0.35 to 0.55 wt % styrene; from 0.05 to 0.5, preferably 0.6 to 0.3, most preferably from 0.085 to 0.2 wt % photo-initiator such as benzyl dimethyl ketal solid available from The Sartomer Company, and from 2.0 to 12, preferably from 3 to 5 wt % monomer composition corresponding to CR-39 such as allyl diglycol carbonate available from Polysciences Corporation discussed above. The composition also includes from 1 to 9 drops, depending upon desired reactivity and darkness, and preferably 4–6 drops of photochromic material comprising photochromic dye dissolved in styrene as discussed above, added to 1 oz. of the mixture and enough mixture is made to cast a lens. The composition is mixed, heated at 115° F. for 20 minutes and mixed continuously to ensure complete dissolution of the crystals and other ingredients. The solution was cast in a conventional lens mold in a conventional manner and cured. The product was a one piece lens having a uniform composition throughout and a rapid reversible photochromism, i.e., a photochromic reversal rate in either direction (dark-light or light-dark) in the order of 15 seconds or less.

Imparting Scratch Resistance

CR-39 plastic ophthalmic lenses are relatively hard and scratch-resistant when compared to other plastic ophthalmic lenses. However, the scratch-resistance of CR-39 lenses is lower than that of glass. Accordingly, it may be desirable to apply scratch-resistant coatings to CR-39 and other plastic ophthalmic lenses. In the present invention, such an outer layer serves not only to impart scratch resistance, but also to seal in the photochromic pigments, e.g., in the case that the wafer lens is photochromic. A wide variety of coating techniques and materials have been proposed over the years for coating lenses with scratch resistant layers. These include applying coating solutions by spin, dip, spray, or flow coating. An automatic apparatus for applying scratch-resistant coatings to plastic ophthalmic lenses is disclosed in U.S. Pat. No. 5,246,499 (Peralta et al). The resulting lens may also be subjected to treatments frequently applied to plastic lenses, including, without limitation, tinting and coating with ultraviolet inhibitors and antireflection coatings, according to known methods. Suitable materials and means for applying them are known in the art, including, without limitation, those disclosed in U.S. Pat. Nos. 4,758, 448 and 4,544,572. Particularly for lens manufacturing processes using UV curing, a yellow tint may remain in the resulting lens or may evolve during aging. This tendency to "yellowing" can be reduced by curing the lens material with the additional of certain antiyellowing chemical agents. These include amine hindered amine light stabilizer (HALS); optical brighteners which makes the yellowing or hindered phenol antioxidants. Another method is to use a photosensitive initiator which is not from the amine group and which will not cause yellowing. The invention described herein can include the use of UV inhibitors coated on the surface of a cured lens or absorbed into the surface of the cured lens to avoid any additional effect on the UV initiators and to substantially prevent or entirely eliminate the transmission of UV light waves into the lens. Such UV inhibitors are well known in the art and need not be described in detail herein. It is desirable to have the UV inhibitors eliminate all UV light and other wavelengths having a wavelength of 500 nm or less and more specifically between 300–425 nm. This treatment process normally involves, after the curing steps, simply dipping the cured lens into a hot bath having any one of the coatings mentioned above to coat the surfaces significantly such that the entire surface of the lens is covered with the inhibitors. The lens formed by the method of the present invention, having been removed from the flexible mold, may be coated by the dipping method. This dipping process, as well as other processes for applying the coatings noted above are well-known to those skilled in the art. Further, the UV inhibitor can be used in solution or otherwise form a composition with the coating discussed above, such that the desired coating along with the inhibitor can be applied to the lens in a one step process during the formation of the wafer lens. Some inhibitor may be absorbed into the lens material. Other known methods of coating can be used in applying the UV inhibitor in the manner described above. Applying hard coat liquid to a concave surface of mold, semi-curing it to a hard state, then proceeding with remolding, imparts a hard-coated front surface when the newly formed composite lens is de-molded. This is an easy way to hard coat the front surface of wafer. Hard coat is incorporated into curing monomer.

Edging

The composite or laminate lens is then mounted on an edger in the normal manner, and an edging process is carried out in order to provide a perimeter to the lens according to the frames in which the lens is to be mounted.

EXAMPLES

Example 1

This Example demonstrates a method for creating non-photochromic bifocal lens from an ophthalmic stock base lens of CR-39 polycarbonate or other high index material. A stock base lens of negative 200 was taken from the shelf with the objective of converting the stock base lens to a negative 200 with bifocal. The negative 200 stock base lens is a four curve. Although the base lens is a "four curve", a "six curve" flexible mold is taken from the shelf. The flexible mold has a 0.5 mm negative impression for the formation of the bifocal section. The flexible mold is cleaned with by hand with 100% alcohol.

The monomer is added by placing 18 to 24 drops onto the flexible mold.

A preformed "four base" stock base lens 2 is cleaned with 99% ethyl alcohol as conventional in the industry, and the clean base lens is placed in the on top of the flexible mold and pushed against the mold, with monomer sandwiched between the lens and the flexible mold.

A suction force of about 10 to 25 pounds is applied to the second side of the flexible mold pulling it downward into the base tool. Additionally, a downward force is applied by the weight of the stock base lens seated on the flexible mold as the suction force is applied. The two forces against the flexible mold, as a result of which (1) monomer is caused to spread evenly over the entire contact surface between the stock base lens, and (2) the flexible mold is caused to deform between the base tool the stock base lens. The lenses are held tightly together during the curing step wherein the lens composite was subjected to two low intensity UV lights, namely, 20 watt black lights from Sylvania Bulbs, placed 3 inches from the bottom of the mold of the lens assembly for 5 minutes as shown in FIG. 2.

Etched glass panels were used as diffusers for dispersing the light emanating from the bulbs about the lens, mold and mold holder. The product was a bifocal lens of which the curvature of the base lens was determined by the base lens, and wherein the curvature of the wafer lens, being predetermined by the negative impression of the flexible mold and adapted to and conformed to that of the base lens. The amount of pressure needed to satisfactorily deform the flexible mold is easily determined and depends upon thickness and pre-heating temperature.

Example 2

The procedure as in Example 1 is followed, except that 10 to 16 drops of a UV curable photochromic photopolymer were applied to the monomer in the flexible mold. More specifically, in this Example, a photochromic pigment and a monomer solvent composition were mixed to form a photochromic material and applied to form the photochromic layer between the monomer and the stock base lens. As the photochromic pigment, Reversacal Plum Red, which is a trade name of Keystone Annalee Corporation, was employed. The photochromic pigment was found to be soluble in toluene, dichloromethane, chloroform, dimethylformamide, which was slightly soluble in alcohols and acetone. Four grams of this photochromic material was mixed in a sterile 6 oz. plastic beaker with 1 oz. of compatible monomer composition, namely, trichloro ethylene and methylene chloride at room temperature. The resulting semi-viscous solution is a photochromic composition for use in forming the photochromic layer. The photochromic composition is not sufficiently adhesive by itself to adhere well to a CR-39 or other plastic lens. For durability under normal conditions of use, it is necessary to bond or fuse the photochromic material to the plastic substrate of the lens. This is done using a clear liquid photopolymerizable monomeric composition which in this Example was tripropylene glycol diacrylate containing a UV catalyst or photo-initiator as needed to induce the monomer to be cured under UV light. The photopolymerizable material with adhesive bond will bond with the CR39 substrate. The photopolymerizable material (i.e., the tripropylene glycol diacrylate monomer mixed with UV catalyst) and the photochromic material are prepared separately and set aside in their respective sterile beakers. When ready to cast the monomer to the base lens, the photochromic liquid composition and the clear adhesive composition were mixed 16:1 by volume in a 1 oz. plastic beaker in a separate area, and then this mixture was applied to the center of the negative impression of the flexible mold with monomer. The four curve stock −200 base lens was then laid on top of the monomer and pressure was applied. This pressure was allowed to disperse the photopolymer monomer over the entire surface between the lens and the monomer forming the wafer-like lens and was allowed to cure under the same conditions as in the previous Example. That is, the mold assembly was subjected to low intensity UV lights 3 inches from the top of the mold of the lens assembly for 5 minutes. Once curing had completed the lens assembly was taken out and found to be a perfect photochromic plastic bifocal −200 lens. Since both curves—the curve of the cast wafer-like lens and the curve of the stock base lens without the bifocal—matched after curing, the photochromic styrenic monomer formed a very uniform and very thin layer between the two lenses, and it cured very quickly to form a bifocal from the original stock base lens. When exposed to UV radiation, the time required to darken the lens is approximately 5 seconds. This is surprising, given that the time for measuring lens darkening of conventional lenses is given in minutes. It is presumed that this effect is attributable to the photochromic pigments being present in front of the UV absorbent containing base lens as compared to conventional photochromic lenses, so as to be more receptive to the ambient UV radiation.

Example 3

This Example created a rapid reaction photochromic lens from a CR-39 three curve stock base ophthalmic lens. The stock base lens selected for the Example was a three curve while the non-corrective flexible mold was a six curve.

All flexible molds (i.e., molds not provided with bifocal segments) have no power because they are formed with curves precisely matching on the front molds. The result is a wafer lens that has no power but is very precise, very even in thickness, and very thin. The stock base three curve lens was cleaned with 100% alcohol by hand, and then the six curve flexible mold was also cleaned with 100% alcohol by hand. The lens and flexible mold were placed base tool positioned on the stage. In a sterile 1 oz. Beaker, a mixture of 16 drops of the monomer was combined with 1 drop of the photochromic material as described above, and the monomer and photochromic material were mixed with a sterile plastic stirrer until the mixture was uniform in color and any bubbles had dissipated, producing a photochromic photopolymerizable composition. Photochromic powder is now directly dissolved into the monomer. This composition was placed in the monomer within the flexible mold, making sure there were no bubbles. The stock base lens that precisely matched the concave curve of the base tool was placed in or on top of the monomer containing flexible mold. Suction was applied to the lower side of the flexible mold sufficiently to deform the flexible mold and disperse the mixture in between the surfaces of the convex surface of the stock base lens and the concave surface of the deformed flexible mold and to cause the pre-heated and softened flexible mold to conform to the base lens. Next, this lens assembly is under the UV curing lamp for 5 minutes under the same conditions as in previous examples.

When the lens was removed, it was found to be photochromic and to have the power that was selected from the stock base. It was also found to be scratch resistant. The photochromic material was locked in due to the effect of the sandwiching of the base lens, the monomer, and the flexible mold.

Example 4

Example 4 illustrates the remolding process for creating a progressive bifocal, which is an invisible bifocal from a single vision CR-39 or other plastic substrate lens.

The process of Example 1 is repeated, except that the bifocal (sharp edge) mold is replaced with a progressive mold.

Example 5

This Example serves to illustrate that even a scratched stock base lens or lens from the patient's frame can be treated to remove the scratches and to simultaneously make that particular lens photochromic.

In this Example, the process of Example 1 is repeated exactly, except that the edged scratched lens of a patient was removed from the spectacles and placed into a flexible mold, and the flexible mold is seated in a base tool that matches the curve the patient's lens. Then, the monomer is cured and cast onto the stock base lens as the above examples were presented in order to illustrate the invention and are not intended to limit the invention in any way. Those working in the art would readily appreciate that substantial modifications within the scope of the invention may be made to the illustrative embodiments. The term ophthalmic lens as used herein is intended to mean any lens of a optical quality transparent material intended to be worn by the user. The term can refer to reading glasses, non-prescription sun glasses, safety glasses, driving glasses, etc. and is not limited to prescription glasses.

Example 6

This Example demonstrates a method for creating a photochromic monocular lens from an ophthalmic stock lens of CR-39 polycarbonate or other high index material. A stock lens is taken from the shelf of a curvature of a pre-determined prescription, say 6 curve. Then a glass mold is selected from the shelf having a matching concave curvature. The rigid glass mold was placed down on a support structure so to remain motionless and in a position to keep the concave curvature facing upward. For the preferred results, three double-sided adhesive tabs were positioned around the perimeter of the concave surface of the rigid mold. Then the stock lens was placed convex surface to concave surface within the rigid mold. The stock lens and the glass mold were held in position by the adhesive on the spacing tabs and allowed a cavity/gap to form between the lens and the mold. Prior to injecting, the monomer and a UV curable photochromic photopolymer were mixed together. The monomer with the photochromic was injected into the cavity. The spacing tabs prevented the stock lens from floating while the monomer was being injected into the cavity. The monomer was then slow cured with ultra violet radiation for about 30 minutes. Once cured, the stock lens was removed leaving the newly formed wafer lens with the rigid mold. The monomer was not sufficiently adhesive by itself to adhere well to a CR-39 or other plastic lens. It was necessary to bond or fuse the photochromic material to the plastic substrate of the lens. This was done using a clear liquid photopolymerizable monomeric composition which in this Example was tripropylene glycol diacrylate containing a UV catalyst or photo-initiator as needed to induce the monomer to be cured under UV light. The photopolymerizable material with adhesive bonds will bond with the CR-39 substrate. The adhesive was applied, and the stock lens was replaced into the assembly of stock lens, wafer lens and glass mold. During the research, it was determined that even though there is a fine, thin layer of adhesive in between the stock lens and the newly formed wafer, if any pressure is applied to the stock lens assembly while the adhesive is spreading out toward the perimeter of that assembly, it will cause waves and distortions in the finished product. Therefore, it was discovered that it was necessary to allow the stock lens to use its own weight to spread the adhesive out. It took between 15 seconds and 45 seconds to spread it completely. Once the adhesive spread, the assembly was flash cured for 5 seconds over high intensity ultraviolet light. The stock lens with the laminated wafer lens was removed from the glass mold. The stock lens has now been transformed into a photochromic stock lens.

Basically, the same steps are followed for transforming a base lens into a bifocal or progressive lens. When making the bifocal or progressive lens, the rigid mold would have a depression for the bifocal or progressive.

Although the system was first designed for providing a method of forming bifocal lens from an ophthalmic stock base lens, the method further includes the ability to render bifocal prescription plastic lenses photochromic. The invention has been described in great detail using a CR-39 lens. By way of example, it will be readily apparent that the process is capable of application to related applications, such as sun glasses, safety glasses, driving glasses, etc., and is thus capable of use in a number of other applications. Although this invention has been described in its preferred form with a certain degree of particularity with respect to modification of a CR-39 lens, it is understood that the present disclosure of the preferred form has been made only by way of example, and that numerous changes in the details of structures and the composition of the system may be resorted to without departing from the spirit and scope of the invention.

What is claimed is:

1. A composite ophthalmic lens vacuum mold for forming an ophthalmic lens therein comprising:

a stage having alignment means for aligning a base tool and a stage opening;

a base tool seated on said stage and having an upper side and a lower side, said upper side being a concave seat and having a central opening defining a passage through the base tool, said lower side having alignment means in engagement with said base tool, said base tool passage being aligned with said stage opening;

a light housing having a light source;

a generally flexible mold having an upper side and a lower side, said upper side having a recess for receiving an amount of a polymerizable composition thereon and said flexible mold lower side being heated and seated within said base tool upper side;

a stock lens, the stock lens being positioned on said polymerizable composition when placed within said recess of said flexible mold; and a vacuum motor having an elongated vacuum tube projecting outwardly therefrom and sized for engaging said stage opening and said passage, said vacuum motor capable of creating a suction force through the vacuum tube for pulling the heated flexible mold against the base tool upper surface and thereby deforming the flexible mold, wherein said light source is capable of emitting radiation at a frequency and for a duration to polymerize said polymerizable composition, thereby causing said polymerizable composition to be laminated on the stock lens to form a composite ophthalmic lens while said flexible mold is suctioned against the base tool.

2. The composite ophthalmic lens vacuum mold as set forth in claim 1, wherein said ophthalmic lens is rendered photochromic by contacting with a mixture comprising a photochromic dye dissolved in a solvent such that at least part of said lens is contacted with said mixture for dispersion of said photochromic dye over said ophthalmic lens;

said lens being subjected to drying to evaporate solvent and form a deposit of photochromic dye on said lens; and said ophthalmic lens being heat treated to cause said deposited dye to be plated onto a first surface of said ophthalmic lens.

3. A method of forming an ophthalmic lens including the steps of:

(a) pre-manufacturing a base tool, the base tool having an upper side and a lower side, the upper side being a concave seat and having an opening that defines a passage through the base tool;

(b) positioning the base tool on a stage and aligning the passage with a stage opening, with the upper side of the base tool facing upwardly and the lower side seated on the stage;

(c) pre-manufacturing a flexible mold with an upper side and a lower side, the upper side of the flexible mold having a recess therein;

(d) pre-manufacturing a first lens, the first lens having a contact surface;

(e) positioning a vacuum tube from a vacuum motor to the stage opening and the passage of the base tool;

(f) filling the recess and the upper side of the flexible mold with an amount of a polymerizable composition;

(g) orientating the first lens in a plane substantially parallel to the plane of the flexible mold;

(h) heating the flexible mold for increasing the pliability of the flexible mold;

(i) bringing the first lens, polymerizable composition, and flexible mold together such that the space between the first lens and the flexible mold is completely filled with the polymerizable composition;

(j) operating the vacuum motor to pull air from within the vacuum tube to create a suction that pulls the heated flexible mold into the concave seat of the base tool for deforming into the curvature thereof while bringing the first lens and flexible mold together such that the space between the first lens and flexible mold completely disperses the polymerizable composition along the contact surface of the first lens;

(k) allowing a light source to shine onto the first lens, the polymerizable composition and the flexible mold for curing of the polymerizable composition onto the first lens;

(l) removing the first lens; and wherein the first lens is a base lens, wherein casting the polymerizable composition forms a wafer lens remaining within the flexible mold after step (l).

4. A method as in claim 3, further including the steps of:

adding a predetermined amount of an adhesive within a center of a concave surface of the wafer lens;

repositioning the base lens within the wafer lens;

allowing the weight of the base lens to evenly disperse the adhesive therebetween;

curing the assembly of the base lens, adhesive and wafer lens with the light source;

disengaging the vacuum motor for release of the flexible mold to release the base lens with the wafer lens laminated thereon; and wherein the flexible mold returns to a non-deformed state.

5. A method as in claim 3, wherein the thickness of said flexible mold is between 2.0 mm and 2.2 mm.

6. A method as in claim 3, wherein the polymerizable composition is a mixture comprising a photochromic pigment and a monomer solvent placed thereon.

7. A method as in claim 3, wherein the polymerizable composition is selected from the group of optical quality materials consisting of diethylene glycol diallyl carbonate, allyl diglycol carbonates, allylic esters, acrylic esters, acrylates, methyl, allyl and butyl methacrylates, polycarbonates, styrenics, polyesters, allyl diglycol carbonates, triallyl cyanurate, triallyl phosphate, triallyl citrate, diallyl phenyl phosphonate, urethanes, epoxies and silicones.

8. A method as in claim 6, wherein the monomer solvent is selected from the group consisting of trichloro ethylene, methylene chloride, vinylbenzene, phenylethylene, and cinnamene, and mixtures thereof and added to the polymerizable composition on the flexible mold.

9. A method as in claim 6, wherein the pigment is a reversible photochromic naphtholpyran compound.

10. A method as in claim 3, wherein said method further includes a step of providing a layer of a scratch resistant coating.

11. A method as in claim 3, wherein the base lens is tinted.

12. A method as in claim 3, wherein the base lens is formed of a optical quality polycarbonate resin.

13. A method as in claim 3, wherein said base lens is formed of allyl diglycol carbonate.

14. A method as in claim 3 wherein the composition of said flexible mold is selected from the group consisting of triallyl cyanurate, triallyl phosphate, triallyl citrate, diallylphenyl phosphonate, acrylic esters, acrylates, methyl, allyl and butyl methacrylates, polycarbonates, styrenics, LEXAN and polyesters.

15. A method as in claim 3, wherein the base lens is a photochromic plastic eyeglass lens cast from a tripropylene glycol diacrylate further comprising:

from 0.3 to 1.0 wt % of a monomer;

from 0.05 to 0.5 wt % photo-initiator;

from 2.0 to 12 wt % allyl diglycol carbonate monomer; and sufficient photochromic dye to render said lens photochromic.

16. A method as in claim 15, wherein the tripropylene glycol diacrylate further comprises:

from 0.53 to 0.6 wt % of a monomer;

from 0.06 to 0.3 wt % photo-initiator;

from 2.0 to 12 wt % allyl diglycol carbonate monomer; and sufficient photochromic dye to render said lens photochromic.

17. A method as in claim 15, wherein the tripropylene glycol diacrylate further comprises:

100 parts by weight tripropylene glycol diacrylate;

from 0.5 to 0.55 wt % of a monomer;

from 0.085 to 0.2 wt % photo-initiator;

from 3 to 5 wt % allyl diglycol carbonate monomer; and sufficient photochromic dye to render said lens photochromic.

18. A method as in claim 15, wherein said monomer is selected from the group consisting of tricholoro ethylene, methylene chloride, vinylbenzene, phenylethylene or cinnamene or mixtures thereof.

19. A method of forming an ophthalmic lens including the steps of:

(a) pre-manufacturing a base lens having a predetermined convex curvature with a lower surface;

(b) pre-manufacturing a rigid mold being sized to have a concave curvature, for receiving the convex curvature of the base lens, the rigid mold having an upper surface and a lower surface;

(c) placing an amount of polymerizable composition onto the upper surface of the rigid mold;

(d) positioning the base lens within the rigid mold and allowing the lower surface of the base lens to rest upon the polymerizable composition and disperse the polymerizable composition;

(e) passing the rigid mold having the base lens thereon and the polymerizable composition therebetween, over a light source emitting radiation at a frequency to polymerize the polymerizable composition, thereby forming a wafer lens;

(f) lifting the base lens away from the rigid mold and leaving the wafer lens adhered to the rigid mold;

(g) placing an optical adhesive within a center of the wafer lens;

(h) re-seating the base lens into the wafer lens and allowing the weight of the base lens to evenly disperse the optical adhesive;

(i) curing the adhesive between the base lens and the wafer lens by passing the rigid mold over the light source;

(j) removing the base lens from the rigid mold; and wherein the wafer lens being laminated onto the base lens after step (j).

20. A method as in claim 19, further including the following steps:

positioning at least a pair of spacers an equal distance about the perimeter of the concave upper surface of the rigid mold prior to placing an amount of polymerizable composition on the upper surface; and positioning the base lens within the rigid mold and allowing the base lens to rest upon the spacers for forming a cavity between the base lens and the rigid mold, wherein the cavity receives the amount of polymerizable composition for forming the wafer lens.

21. A method as in claim 19, wherein the polymerizable composition is a mixture comprising a photochromic pigment and a monomer placed thereon.

22. A method as in claim 19, wherein the polymerizable composition is selected from the group of optical quality materials consisting of diethylene glycol diallyl carbonate, allyl diglycol carbonates allylic ester, acrylic esters, acrylates, methyl, allyl and butyl methacrylates, polycarbonates, styrenics, polyesters, allyl diglycol carbonates, triallyl cyanurate, triallyl phosphate, triallyl citrate, diallyl phenyl phosphonate, urethanes, epoxies and silicones.

23. A method as in claim 21, wherein the monomer is selected from the group consisting of trichloro ethylene, methylene chloride, vinylbenzene, phenylethylene, and cinnemene, and mixtures thereof and added to the monomer on the rigid mold.

24. A method as in claim 21 wherein the pigment is a reversible photochromic naphtholpyran compound.

25. A method as in claim 21, wherein said method further includes a step of providing a layer of a scratch resistant coating.

26. A method as in claim 19 wherein the base lens is tinted.

27. A method as in claim 19, wherein the base lens is formed of a optical quality polycarbonate resin.

28. A method as in claim 19, wherein said base lens is formed of allyl diglycol carbonate.

29. A method as in claim 19, wherein the base lens is a photochromic plastic eyeglass lens cast from a tripropylene glycol diacrylate further comprising:

from 0.3 to 1.0 wt % of a monomer;

from 0.05 to 0.5 wt % photo-initiator;

from 2.0 to 12 wt % allyl diglycol carbonate monomer; and sufficient photochromic dye to render said lens photochromic.

30. A method as in claim 29, wherein the a tripropylene glycol diacrylate further comprises:

from 0.53 to 0.6 wt % of a monomer;

from 0.06 to 0.3 wt % photo-initiator;

from 2.0 to 12 wt % allyl diglycol carbonate monomer; and sufficient photochromic dye to render said lens photochromic.

31. A method as in claim 29, wherein the a tripropylene glycol diacrylate further comprises:

100 parts by weight tripropylene glycol diacrylate;

from 0.5 to 0.55 wt % of a monomer;

from 0.085 to 0.2 wt % photo-initiator;

from 3 to 5 wt % allyl diglycol carbonate monomer; and sufficient photochromic dye to render said lens photochromic.

32. A method as in claim 29, wherein said monomer is selected from the group consisting of trichloro ethylene, methylene chloride, vinylbenzene, phenylethylene or cinnamene or mixtures thereof.

33. A method as in claim 19 wherein the base lens is a polaroid lens.

34. The composite ophthalmic lens vacuum mold as set forth in claim 1, wherein said light source is a UV lamp.

35. A method as in claim 19, wherein the rigid mold is a glass mold.

* * * * *